United States Patent
Hunneybell

(10) Patent No.: US 8,443,192 B2
(45) Date of Patent: May 14, 2013

(54) NETWORK SECURITY METHOD

(75) Inventor: Iain Hunneybell, Diss (GB)

(73) Assignee: IP Marketing Limited, South Lopham, Diss (GB)

(*) Notice: Subject to any disclaimer, the term of this patent is extended or adjusted under 35 U.S.C. 154(b) by 276 days.

(21) Appl. No.: 12/565,591

(22) Filed: Sep. 23, 2009

(65) Prior Publication Data

US 2010/0088513 A1 Apr. 8, 2010

Related U.S. Application Data

(63) Continuation of application No. PCT/GB2008/050214, filed on Mar. 25, 2008.

(51) Int. Cl.
*H04L 9/32* (2006.01)

(52) U.S. Cl.
USPC .............................................. 713/168; 726/23

(58) Field of Classification Search ............... 713/176, 713/168; 726/23, 7, 26; 709/206
See application file for complete search history.

(56) References Cited

U.S. PATENT DOCUMENTS

| | | | | |
|---|---|---|---|---|
| 7,457,958 B2 * | 11/2008 | Olkin et al. | | 713/176 |
| 7,461,257 B2 * | 12/2008 | Olkin et al. | | 713/176 |
| 2005/0076221 A1 * | 4/2005 | Olkin et al. | | 713/176 |
| 2005/0076222 A1 * | 4/2005 | Olkin et al. | | 713/176 |

FOREIGN PATENT DOCUMENTS

| | | |
|---|---|---|
| WO | WO 2005/078993 | 8/2005 |
| WO | WO 2005/101185 | 10/2005 |
| WO | WO 2006/026098 | 3/2006 |
| WO | WO 2006/047927 | 5/2006 |
| WO | WO 2007/078626 | 7/2007 |

* cited by examiner

*Primary Examiner* — Samson Lemma
(74) *Attorney, Agent, or Firm* — Thorpe North & Western LLP

(57) ABSTRACT

This invention provides a method for allowing the recipient of a message 2 to confirm the identity of the sender. In the message 1 the sender provides a web address that comprises an identifying code uniquely assigned to that message. The sender also provides a document 4 at that web address that comprises confirmatory information already known to the recipient.

22 Claims, 3 Drawing Sheets

NETWORK SECURITY METHOD

PRIORITY CLAIM

This application is a continuation of PCT patent application Serial No. PCT/GB2008/050214 filed on Mar. 25, 2008, which claims priority to GB patent application Serial No. 0705634.4 filed on Mar. 23, 2007, which are hereby incorporated herein by reference in their entirety.

FIELD OF THE INVENTION

This invention relates to a security system for use over networks.

BACKGROUND TO THE INVENTION

The legitimate use of Email in business to consumer and business to business communication and marketing is becoming ever more threatened by the rise in unsolicited Email (spam) and more particularly fraudulent messages seeking to steal customers' private information (phishing).

A business may wish to legitimately remind a customer that an account statement is ready for review, that an invoice is due for payment, a statutory declaration is due to be made or simply advise them of a new product or service that the user, their customer, may be interested in. Many of these notices require the user to visit a website and login or at least identify themselves to be able to view details, download information or make changes to their account. A typical message will therefore provide (i) notice of the action the user will need to take and (ii) a hyperlink direct to the appropriate webpage. This allows the user to easily act on the notice.

'Phishing' is a technique where a fraudulent website is created and then fraudulent Emails are sent which encourage the recipient to follow links in the message to the fraudulent site. Once there the user is asked to reveal private information, for example by supposedly re-verifying Paypal® or bank account details. A recent phishing Email claims to come from HM Revenue & Customs and advises the recipient that they are eligible for a tax refund if they provide the details of a debit or credit card to which the refund can be made. These details are simply forwarded to the fraudster for illicit use.

Phishing Emails are distributed to huge lists of addresses, often to many people who don't have any connection with the business mentioned in the Email. This isn't an issue so long as the fraudster can reach a sufficient number of recipients who do hold such a bank account and are then fooled into revealing their details such as bank account or login information.

Often the fraudulent sites are 'skimmed' from the real site and so look identical to the real site. Often these 'phishing sites' are placed on compromised legitimate web servers without the knowledge of the owner, providing the fraudster a convenient hosting solution with no link back to themselves. The creation of these 'sites' is becoming every more automated with the fraudster able to 'skim' the real site and place a copy on a compromised host within a few minutes, thereby incorporating any recent site design or security details into the fraudulent site often including warnings about fraudulent Emails. The fraudulent sites can therefore look highly convincing, as can the phishing Emails.

A variety of solutions currently exist to try to tackle phishing fraud, all of them with some drawbacks. There are monitoring services that try and identify phishing sites early and arrange for the removal of the phishing pages. However, this approach can only ever have an effect after the phishing attack has already started. A site cannot be removed until that site has been created and even then removal can take several days as the compromised web server hosting the phishing page may be anywhere on the Internet—and hence anywhere in the world—and the server owner may be slow or even reluctant to act. Banks and other institutions often need to resort to legal threats to ensure the removal of a phishing site. A similar problem affects the browser plug-ins often incorporated into Internet Security products that attempt to detect phishing websites by checking against lists of known sites. The list can only include a site after that site has been created and already begun to function.

Email filters can help reduce phishing attacks, but they are subject to the same techniques used by other sorts of spam such as the use of images instead of text to ensure that spam filters do not detect them. In addition, filters that work by identifying links in messages to a domain other than the one from which the Email is sent are likely to cause problems with legitimate Email where a business uses outsourced Email sending services.

Server certificates provide the basis for secure, encrypted communication between the user and the website. These certificates also provide a 'certification path' that shows both who issued the certificate and to whom it was issued, thereby assuring the user that they are truly accessing a website operated by the organisation they believe they are dealing with. However many users do not have the level of technical knowledge necessary to take advantage of this. Therefore this solution while technically available is not practicable for widespread general use.

Other solutions, such as the use of digital certificates or card readers, require the user to install extra software or hardware on their computer. Therefore the user cannot access their account on any other computer unless they go through another cumbersome installation process.

A final group of solutions attempts to reduce the harm in losing a password. For example, the user may be provided with one-off or time-sensitive passwords. Hence the user has a list of passwords that are either valid only once or only for a particular time on a particular day, as is the case with the RSA SecurID® system which relies upon the user having an electronic password generator that changes the password every sixty seconds. However, these solutions are still vulnerable to an emerging form of 'man-in-the-middle' phishing attack. Even if the password is time sensitive or for once-only use, the phisher can still access the user's account if the user can be fooled into providing the time sensitive or once-only use password to the phisher who then uses it immediately with the live site, often without the user being aware of the theft of their password. Also, when a list or time sensitive password is used the user can no longer simply remember the password, so the physical record or password generation device the user has to keep is also open to abuse or theft and associated replacement costs.

Another variation is to use a long password and ask only for a few characters from it. How effective this is depends upon how long the password is and an effective scam might give a user an apparent login failure first time around and so get them to provide two sets of 'random' letters, selected to ensure the phisher could obtain the maximum number of letters from the password. From this the password might even be guessed. The Entrust®IdentityGuard system provides the user with an alphanumeric grid from which only a few numbers or letters will be requested each time. This sort of system enhances security, but requires the distribution of cards without which the user cannot access their account, and which are open to abuse if they fall into the wrong hands. This form of system is also open to 'man-in-the-middle' attack if the user can be fooled into providing details to a fraudulent site.

The dramatic rise in these phishing Emails is causing users to question legitimate Emails making it ever more difficult for e-based businesses to communicate with their online users. Apart from the financial costs due to theft incurred by a business when user accounts are compromised, there are the costs associated with the bad publicity and fear of fraud among users. There is also considerable expense to the business in fraud detection, prevention and pursuit.

SUMMARY OF THE INVENTION

This invention provides a method for allowing the recipient of a message to confirm the identity of the sender and/or the authenticity of a website linked from the message. In the message the sender provides a web address that comprises an identifying code uniquely associated with the recipient of the message. The sender also provides a document at that web address that comprises confirmatory information previously agreed by the recipient.

In this way the invention is able to provide an easy to understand means for the user to determine whether they have received a genuine message and are accessing the legitimate service. The document at the web address confirms to the user that they have accessed the legitimate site before they move on to any resource, be that something requiring a login or provision of private information, or simply informational content. Additionally, the recipient need not use browser plug-ins or other software to be secure; this solution works with every type of browser on every type of client machine as the solution is simply a web document from the legitimate site.

The invention is based on the premise that if a message is legitimate then the recipient and the sender should already know one another. This should be true even for many businesses sending marketing-only messages. For example, under anti-spam regulations businesses should not be sending unsolicited Email to users unless the user has positively opted-in to receive that Email, i.e. the user has registered their Email address with the business and their ownership of this Email address has been verified via an Email confirmation process.

The identifying code may be uniquely associated with the message. In this case, because the link is unique to the recipient, the message and the link in the message, the sender is also able to determine the resource desired by the recipient and provide a convenient 'Proceed' hyperlink or similar within the document if they wish. Once the recipient has been able to confirm that they are dealing with the legitimate site, the recipient can follow this link directly to a desired resource.

The message sent by the sender may be an Email. However, the invention is not restricted to Email or even that the message be electronic. For example, the web address could be contained in an ordinary letter, a text message, an instant message, or any other suitable communication between the sender and the recipient.

The identifying code may be encrypted. This will provide additional security by making it more difficult for an illegitimate party, such as a phisher, to guess or anticipate identifying codes.

The confirmatory information may include an identifying message chosen by the recipient. While this message could be a single word as is usual for passwords, it need not necessarily be this. The message could take many forms, including a phrase, or several sentences. The identifying message could also consist of an extract chosen at random from a larger text, such as a novel that the recipient knows well. While it would be usual to use words as they take up little memory space, it is not necessary to do this. The identifying message could include an image such as a photograph, pattern or copy of the recipient's signature. The identifying message could also include a sound such as a voice recording or music. The identifying message could be any information suitable for communication over the network that the recipient will recognise.

The confirmatory information may include some of the recipient's biographical information. The confirmatory information must be something known by both the sender and the recipient, and easily recognised by the recipient. Therefore the confirmatory information will often comprise personal information about the recipient. Different kinds of biographical information may be used, including a line from the recipient's address or the recipient's date of birth. Other examples could be the recipient's mother's maiden name or the postcode of the recipient. Many of these examples are personal but not private; that is they are not easy to guess and they may be unique to the recipient, especially in combination, but they are not secret and do not need to be guarded as closely as, for example, a bank account number or password.

It may be that the document can only be accessed at the web address a pre-determined number of times. It may be that the document can only be accessed at the web address during a pre-determined period of time. By using either of these constraints, or both, the sender will reduce the opportunities an illegitimate party such as a phisher will have to access the confirmatory information.

It may be that the confirmatory information does not identify the recipient. If the confirmatory information is chosen with this in mind, this would help to prevent the system being abused by a person other than the recipient or the sender who gains access to the confirmatory information in the document.

BRIEF DESCRIPTION OF THE DRAWINGS

An embodiment of the invention will now be described, by way of example only, and with reference to the accompanying drawings, in which.

DETAILED DESCRIPTION OF EXEMPLARY EMBODIMENTS

Figure 1:
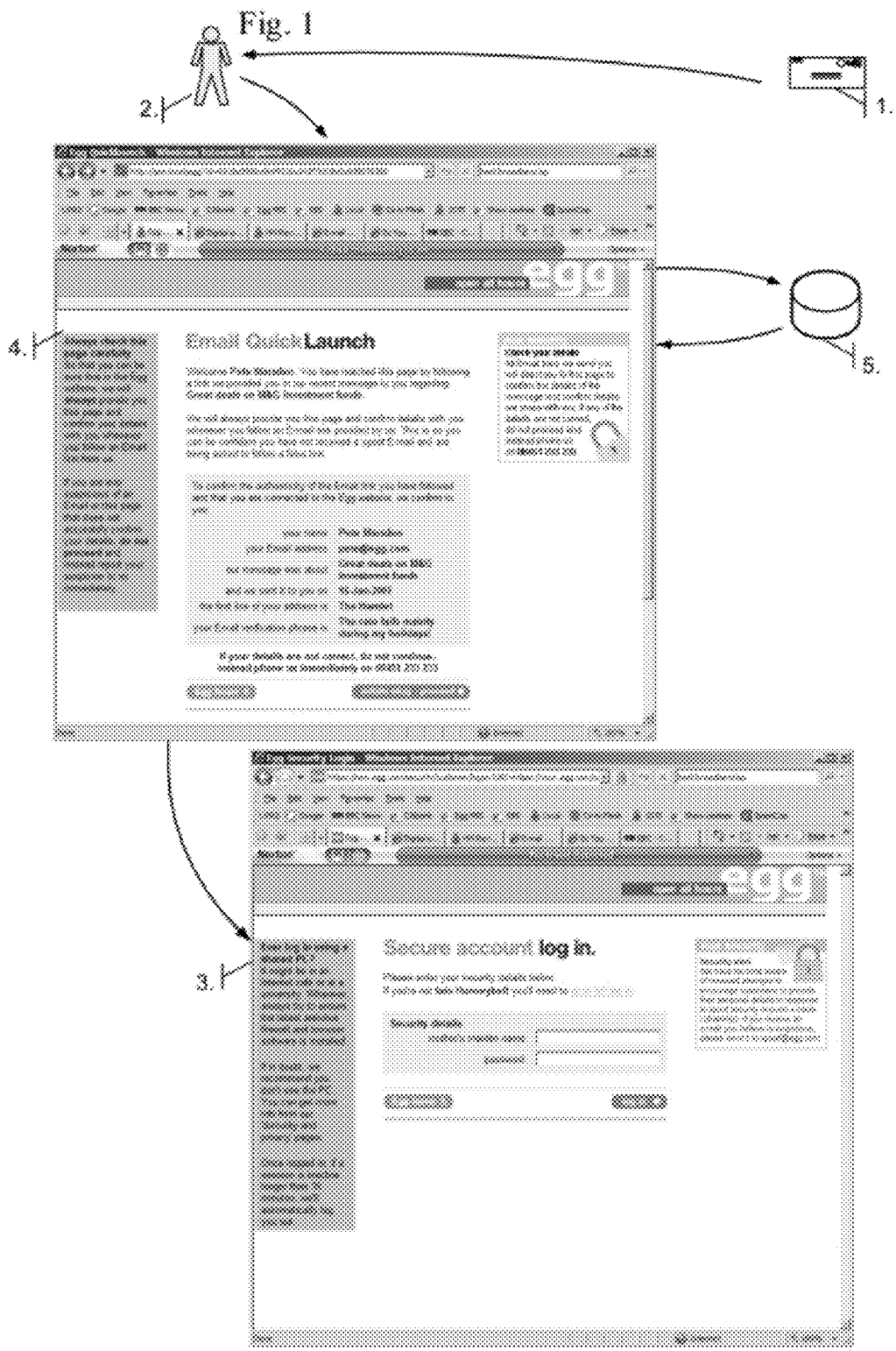
FIG. 1 is a diagrammatic representation of the user's experience using an embodiment of the invention.

FIG. 1 shows a diagram that illustrates the use of the invention. When a bank wishes to inform its users of a new service it is offering the bank creates an Email 1 which it transmits to the user 2. Contained within the Email are the details of the offer and a complimentary link that the user can visit if they want to take up the offer. The link contains a code that is unique to that Email to that recipient.

Rather than sending the user directly to the login page 3 the link opens an intermediate webpage 4. When the page is accessed, the unique code is sent to a contact database 5. The contact database returns a list of user details which are presented to the user by the intermediate webpage 4. Only if the user sees accurate information do they pass on to the login page 3 via the complimentary 'Proceed' button.

The contact database 5 also creates a log of use of the unique code and so creates an audit of users who have followed the links provided in Emails sent to them which the bank can use to assess the effectiveness of its marketing and the popularity of its online products as well as in tailoring future offers to appeal to particular users.

Figure 2:
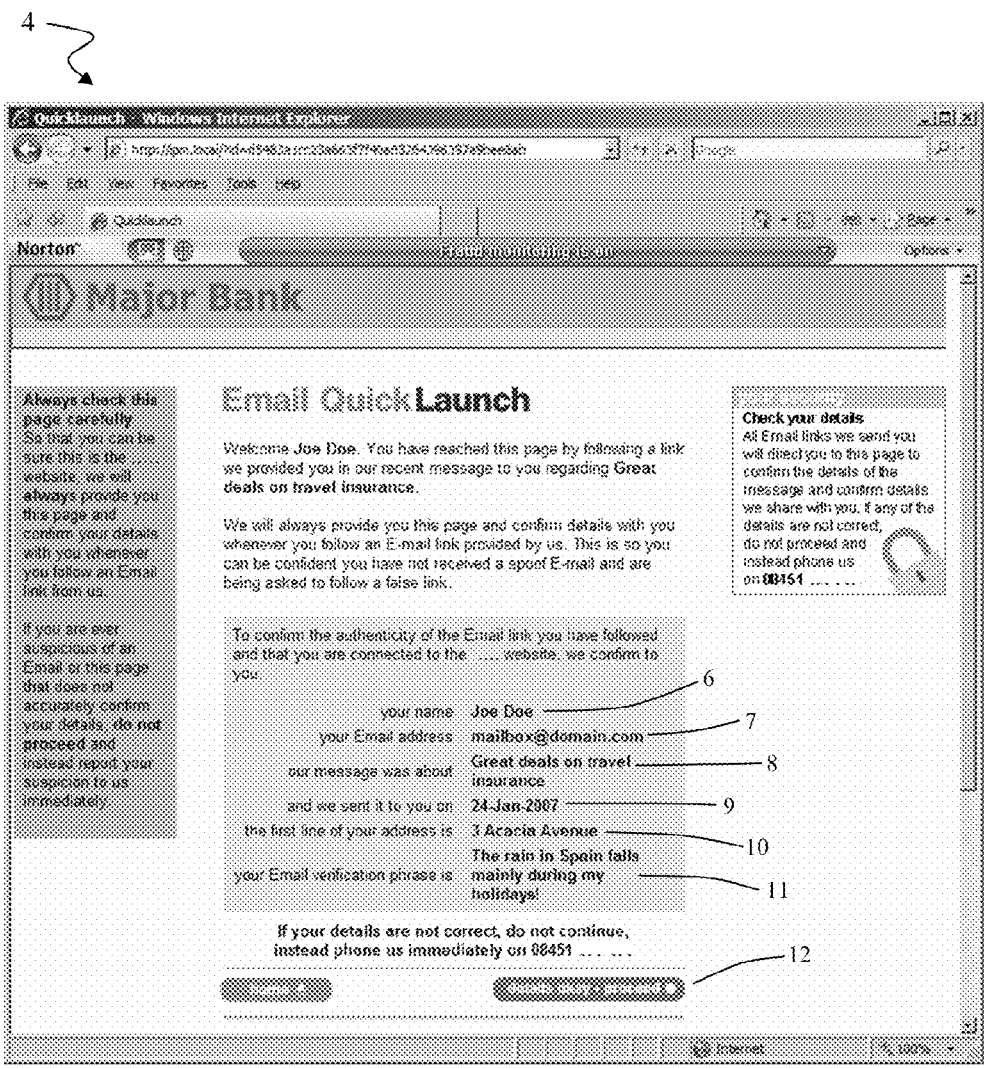
FIG. 2 is an example of a web page according to the same embodiment of the invention.

FIG. 2 is an illustration of the intermediate webpage 4. The page incorporates a number of personal details which were supplied by the contact database 5. These details include: the user's name 6; their email address 7; the subject 8 and date 9 of the Email 1; the first line of their address 10; and a verification phrase 11 that was established previously.

By reviewing the details on webpage 4 the user can satisfy themselves that the Email 1 and the link that the Email contained were genuine. This is because a criminal who had created a phishing Email would not normally be able to acquire these details nor relate them to a specific Email recipient. The phisher would be very unlikely to be able to present a postcode, first line of address or other shared personal information between the user and the legitimate organisation. The phisher should also be completely unable to present the secret Email link verification phrase 11.

A phisher is unlikely to know a recipient's full name. Sometimes the recipient's name may be derived from the email address, but this would probably require intervention by a human eye due to the many forms an email address may take and the huge variety of possible names and spellings.

With some effort, the phisher would be able to present the email address to which a fraudulent email was sent on the linked website. They would also be able to present a reason for the link and the date on which the fraudulent message was sent. However, while it is technically possible for a phisher to replicate some of the information included on the legitimate intermediate webpage 4, this is restricted by practical concerns as phishing attacks typically involve placing a single simple fake webpage on a compromised server. As such the ability to perform more complex 'per user' personalised responses so as to mimic the invention are restricted.

Information such as the message subject is also provided partly for legitimate use where the organisation is able to reconfirm the details of its Email to the user. Therefore errors where a user is sent to the wrong link or an Email is incorrectly addressed are more easily detected.

Once the user has reviewed these details they can proceed to the login page 3 by following the link 12 provided, where they provide their login details in confidence and are given access to the site.

The unique code used in the link in Email 1 is an encrypted value. This encryption helps to prevent a phisher experimenting with the code to reveal details of site users. Otherwise the phisher might be able to access the intermediate webpage 4 by trying different unique codes in an attempt to harvest legitimate user information for use later.

This embodiment uses a single Uniform Resource Locator (URL) of /quicklaunch, with a unique query string (e.g. ?id=b27b41feecc0a5a45ad1bfa42765474174d5e09e). It is the query string value that identifies the link in the Email. This query string allows, via a simple lookup, the display of the confirmatory personal details on intermediate webpage 4. In this embodiment a SHA-1 (Secure Hash Algorithm 1) value is used. This is a 40 character alphanumeric string giving a potential number of combinations of $36^{40}$ ($1.78\times10^{62}$) codes.

It is the number of combinations of the code that provide its security. It would be impossible for a phisher to try different codes so as to collect the personal details in preparation for an attack, as the number of combinations is simply so high.

This embodiment of the invention has benefits beyond protecting users from phishing. Many businesses may want to determine whether a customer has received an Email, particularly if the Email forms some kind of official notice (of payment due, statement availability etc.). Tracking the reading of these Emails is often done by sending the Email in an HTML format incorporating 'tagged images'. These 'tagged images' carries a unique code. When the message is opened and the mail client retrieves the images from the businesses web server, this unique code is noted advising that the message has been opened.

However, the use of tagged images is liable to failure. Because of the power of the tagged images method many mail clients, Microsoft® Outlook® being an example, automatically suppress the retrieval of HTML message images unless the user specifically orders the program to download the images or has added the sender to a 'Safe Sender' list. This means the message may be opened and read without the opening being recorded by the business web server as no images will be read.

It is possible, however, that the Email may still serve it's purpose. If the user receives a message advising them that their statement is ready they do not need to download the images in order to follow the link provided within the Email. They may even type the website address directly into their browser (or use a bookmark) specifically because they are concerned about potentially fraudulent Email links.

This embodiment of the invention helps overcome these issues as it accurately records each access. The system is able to tell both whether a user 'clicked-in' to the intermediate webpage 4 following a link from an Email, and whether they 'clicked-out', i.e. proceeded on to the login page 3 (or some other resource). This form of tracking will work irrespective of whether the user opts to download images in an HTML message. All they are required to do is follow any link provided.

This embodiment of the invention will also help to reveal Domain Name Server (DNS) attacks and Host File attacks. These attacks work because the user's computer needs to resolve a name, such as 'www.bbc.co.uk', into an Internet Protocol (IP) address. The computer does this first by checking the local Host File on the client machine. If it doesn't find the name there then the user's computer queries its DNS, a computer on the network with a registry of IP addresses. The DNS provides an IP address and it is the IP address, not the name, that the browser on the user's computer accesses.

Thus if an entry was added into the user's computer's Host File that said:

213.219.56.196 www.bbc.co.uk

Then if the user entered the address www.bbc.co.uk into their browser, the browser would display the homepage of ITN® rather than the BBC®. This is because 213.219.56.196 is the IP address of ITN, not the BBC. There is considerable concern about 'DNS contamination' as DNS was not designed to be secure and all of an Internet Service Provider's clients could be misdirected to a phishing site if a DNS could be contaminated. Alternatively, an individual user's host file could be corrupted, for example by a virus, and they could be sent to the phishing site that way.

Therefore, even manually entering a website address that the user knows to be legitimate into a browser is not a guarantee against fraud. However, if the user accesses the website of a business by following a link according to the invention, then the user will know to expect to see their personal details confirmed to them. If they do not because they have been misdirected to a fraudulent site, then their details cannot be displayed and they will know that the website is not legitimate.

This embodiment of the invention may also help to encourage the use of Email links, and therefore allow collection of statistics on message and link effectiveness, by always providing the user assurance that they are accessing the legitimate site. Therefore security precautions such as typing a website address manually or using a bookmark, become less important as a means to prevent inadvertent following of a fraudulent link.

Figure 3:
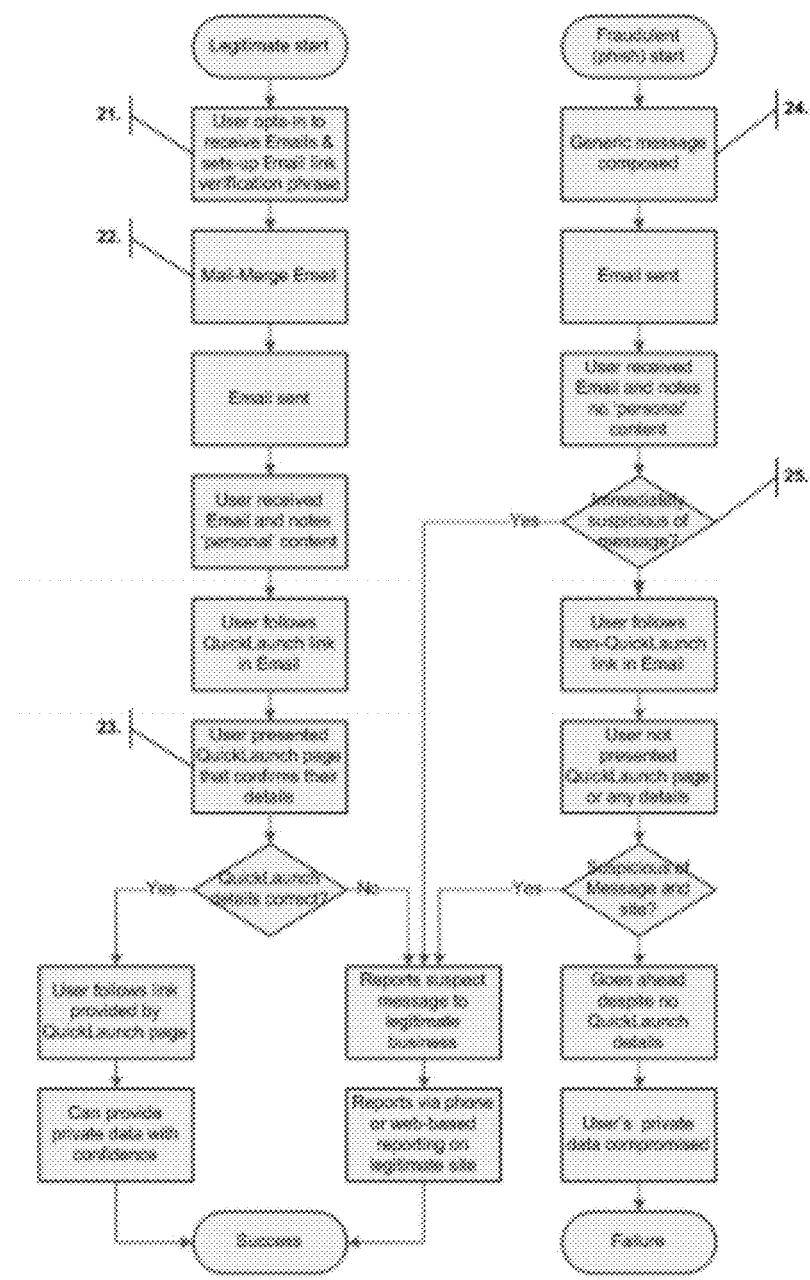
FIG. 3 is a flow chart illustrating the use of the invention according to another embodiment compared with the use of an attempted phishing attack.

FIG. 3 is a flow chart that contrasts the user experience between following a legitimate Email according to a second embodiment of the invention on the left and a phishing Email on the right. In FIG. 3, the term QuickLaunch is used for systems designed according to the invention.

When the user opts-in to receive legitimate Emails at box 21, the opt-in process stresses that all future communications from the business will include a QuickLaunch link. Following these links will always result in the user being presented with their confirmation details before they are asked to supply any information. It is important that this is the case, and the user knows this, since phishing Emails will be able to take advantage of any exceptions or the user's ignorance.

When a legitimate Email is created in box 22, that Email incorporates some personal details such as the user's name. These details provide the user with an extra security check, since if they receive a generic Email their suspicion should be aroused. If the business is happy to use HTML in its Emails, then the use of personal details in these Emails can be enhanced by including the personalised content of the Email in the form of a personalised image. Using images makes skimming of this information more complex for people other then the user. As the personalised image is tagged with a unique identifier and the user is encouraged to download this image to check the veracity of the Email, the use of images would also help to track when the Email is read by the user.

In this embodiment of the invention, the user's name and Email address are omitted from the QuickLaunch page displayed to the user at box 23. Omitting these details ensures that, even if the phisher gains access to the QuickLaunch page, they cannot match the details presented with a potential Email target.

When the phisher creates a fraudulent Email at box 24, the Email will almost certainly be generic. Even the user's name, which might be guessed from the Email address, would be a good check since phishing depends on sending thousands if not millions of Emails, and it is not practical for the phisher to guess that many names. Therefore the user will hopefully detect the fake at box 25 and report the suspect Email to the legitimate business. However, the user may not notice, for example, that the Email is addressed to "Dear valued customer". In this case, the user may follow the link in the Email and arrive at the fraudulent website, which will not be able to provide an intermediate page which accurately incorporates their personal details.

The business uses QuickLaunch consistently for all Email links sent. It is not sufficient to consider that because a link is simply taking a user to an information page, that it is therefore safe to send the user there 'directly'. This is because a fraud could involve luring a user to a fraudulent site to view public access information before lulling them into a sense of false security and then asking them to login or provide other personal details. The phisher might, for example, send an Email that promised particularly good product offer such as an exceptional interest rate offer or a free prize draw. Having lured the user to a fake website and possibly shown them a number of pages of information, the phisher could then ask the user to provide their private information so as to apply for the product or prize draw.

To prevent such a phishing scam from working, the user must know that they will always see a QuickLaunch confirmation screen before proceeding to any required resource. This will become implicit if QuickLaunch is used consistently.

Since the business contacts all its users using QuickLaunch consistently, and has made it clear to them that this will always be the case, when the user is not presented with a QuickLaunch page upon following the link they should be immediately suspicious. This will dramatically reduce the number of people who fall prey to phishing attacks.

In summary, this invention provides a method for allowing the recipient of a message to confirm the identity of the sender and/or authenticity of any linked website. In the message the sender provides a web address that comprises an identifying code uniquely assigned to that message. The sender also provides a document at that web address that comprises confirmatory information already known to the recipient. The invention may also be considered as a method of secure data communication.

The invention claimed is:

1. A method for allowing a recipient of a message received by a computer to confirm the identity of a sender, the method comprising:
   providing in the message, received at the computer, a web address that comprises an identifying code uniquely associated with the recipient of the message;
   providing the identifying code to a contact database, operating on a server communication with the computer, thereby selecting stored confirmatory details of the recipient that are associated to the identifying code, and
   receiving, at the computer, a document that comprises confirmatory information previously agreed to by the recipient, wherein the document is received from a server associated with the web address.

2. A method as claimed in claim 1, wherein the identifying code is uniquely associated with the message.

3. A method as claimed in claim 1, wherein the message is an Email.

4. A method as claimed in claim 1, wherein the identifying code is encrypted.

5. A method as claimed in claim 1, wherein the confirmatory information comprises an identifying information chosen by the recipient.

6. A method as claimed in claim 1, further comprising accessing an intermediate webpage that is associated with the web address, wherein the webpage is located on a web server accessible via the internet, wherein the confirmatory information comprises selected secret information shared between the intermediate web page and the recipient.

7. A method as claimed in claim 1, wherein the document can only be accessed at the web address a pre-determined number of times.

8. A method as claimed in claim 1, wherein the document can only be accessed at the web address during a pre-determined period of time.

9. A method as claimed in claim 1, wherein the confirmatory information does not identify the recipient.

10. A method as in claim 1, further comprising enabling the recipient to continue to a login page if the confirmatory information is accurate to enable the recipient to be confident the login page is not associated with phishing.

11. A method for allowing a recipient of a message by a computer to confirm the identity of the sender, the method comprising:

receiving a message at the computer, wherein the message includes a web address that comprises an identifying code uniquely associated with the recipient of the message;

accessing an intermediate webpage using the computer that is associated with the web address, wherein the webpage is located on a web server accessible via the internet;

providing the identifying code to the web server wherein the web server communicates the identifying code to a contact database accessible by the webserver;

providing the intermediate webpage with confirmatory information stored on the contact database that is associated to the identifying code;

sending confirmatory information to the recipient at the computer via the intermediate webpage; and proceeding to a desired web site at computer if the user confirms the confirmatory information from the intermediate webpage contains accurate information.

12. A method as claimed in claim 11, wherein the identifying code is uniquely associated with the message.

13. A method as claimed in claim 11, wherein the message is an Email.

14. A method as claimed in claim 11, wherein the identifying code is encrypted.

15. A method as claimed in claim 11, wherein the confirmatory information comprises identifying message information chosen by the recipient.

16. A method as claimed in claim 11, wherein the confirmatory information comprises selected secret information shared between the intermediate web page and the recipient.

17. A method as in claim 11, wherein the confirmatory information is contained in a computer readable electronic document.

18. A method as claimed in claim 17, wherein the computer readable electronic document can only be accessed from the web server a pre-determined number of times.

19. A method as claimed in claim 17, wherein the computer readable electronic document can only be accessed at the web server during a pre-determined period of time.

20. A method as claimed in claim 11, wherein the confirmatory information does not identify the recipient.

21. A method as claimed in claim 1, wherein the contact database creates a log of use for the unique identifying code and creates an audit of the recipients who have followed the web address provided in the message.

22. A method as claimed in claim 11, wherein the contact database creates a log of use for the unique identifying code and creates an audit of the recipients who have followed the web address provided in the message.

\* \* \* \* \*